(12) United States Patent
Veasy et al.

(10) Patent No.: US 11,274,416 B2
(45) Date of Patent: Mar. 15, 2022

(54) METHOD OF CALIBRATING A SENSOR ON A WORK VEHICLE

(71) Applicant: Deere & Company, Moline, IL (US)

(72) Inventors: David A. Veasy, Dubuque, IA (US); Craig Christofferson, Dubuque, IA (US); Michael D. Peat, Dubuque, IA (US); Lance R. Sherlock, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 197 days.

(21) Appl. No.: 16/380,752

(22) Filed: Apr. 10, 2019

(65) Prior Publication Data

US 2020/0325652 A1    Oct. 15, 2020

(51) Int. Cl.
*E02F 3/84*   (2006.01)
*G01B 21/06*   (2006.01)
*F15B 15/28*   (2006.01)

(52) U.S. Cl.
CPC .......... *E02F 3/844* (2013.01); *F15B 15/2815* (2013.01); *G01B 21/06* (2013.01)

(58) Field of Classification Search
None
See application file for complete search history.

(56) References Cited

U.S. PATENT DOCUMENTS

| | | | |
|---|---|---|---|
| 8,738,242 B2 | 5/2014 | Konno et al. | |
| 9,328,479 B1* | 5/2016 | Rausch | E02F 3/847 |
| 9,453,855 B2 | 9/2016 | Orzechowski | |
| 9,587,969 B2 | 3/2017 | Zabegaev | |
| 9,886,038 B2 | 2/2018 | Webber et al. | |
| 10,030,366 B2 | 7/2018 | Tevis et al. | |
| 2009/0056961 A1* | 3/2009 | Gharsalli | E02F 3/844 |
| | | | 172/4.5 |

(Continued)

FOREIGN PATENT DOCUMENTS

DE    112015006905 T5    7/2018
EP        3382105 A1    10/2018

OTHER PUBLICATIONS

U.S. Appl. No. 16/130,741, filed Sep. 13, 2018, by Kean et al.

(Continued)

*Primary Examiner* — Paul M. West
*Assistant Examiner* — Mark A Shabman
(74) *Attorney, Agent, or Firm* — Michael Best & Friedrich LLP (57) ABSTRACT

A work vehicle including a body, an operational frame movable relative to the body about a primary joint, a linkage arrangement configured to adjust a position of the operational frame relative to the body, and a working implement coupled to the operational frame and movable relative to the body. A first sensor is positioned on the body. A second sensor is positioned on at least one of the operational frame, the linkage arrangement, and the working implement. A processor is configured to receive a first signal from the first sensor, where the first signal is representative of a measurement sensed by the first sensor, receive a second signal from the second sensor, where the second signal is representative of a measurement sensed by the second sensor, and determine a measurement error of the first sensor based on the signals from the first sensor and the second sensor.

20 Claims, 8 Drawing Sheets

(56) References Cited

U.S. PATENT DOCUMENTS

2017/0342684 A1* 11/2017 Sherlock ................ E02F 3/841
2018/0016769 A1   1/2018 Omelchenko

OTHER PUBLICATIONS

U.S. Appl. No. 16/130,743, filed Sep. 13, 2018 by Kean et al.
German Search Report issued in counterpart application No. 102020203062.6 dated Jan. 15, 2021 (08 pages).

* cited by examiner

METHOD OF CALIBRATING A SENSOR ON A WORK VEHICLE

FIELD OF THE DISCLOSURE

The present disclosure relates to work vehicles, and specifically to a method of calibrating a sensor positioned on a work vehicle.

BACKGROUND

Work vehicles are often used to manipulate a surface (e.g., the ground) or to move materials (e.g., dirt, crop). For example, motor graders are used to contour and smooth out the surface of a construction site. Generally, motor graders include, among other things, a main frame, a draft frame, a circle frame, a tilt frame, and a working implement. The main frame supports an operator cabin and the motor of the vehicle. The working implement is used to manipulate the surface or to move surface or near-surface materials. The working implement is in some applications a blade capable of moving ground and dirt to create a desired surface contour. In other applications, however, the working implement may be a shovel or other tool capable of manipulating the ground or otherwise moving materials.

Operation of the draft frame, the circle frame, and the tilt frame controls the movement of the blade to create the desired ground surface. In particular, the draft frame supports the circle frame, the tilt frame, and the blade and is capable of moving relative to the main frame. The circle frame supports the tilt frame and the blade and is capable of rotating relative to the draft frame. The tilt frame supports the blade and is capable of moving the blade relative to the circle frame.

Each of these operational frames (i.e., the draft frame, the circle frame, and the tilt frame) controls a different direction of movement and/or rotation of the blade. Accordingly, manipulation of the draft frame, the circle frame, and the tilt frame allows the blade to be adjusted between many different positions and orientations to shape the ground surface. Precisely controlling the blade can be a complex task, which requires an operator to operate the draft frame, the circle frame, and the tilt frame in order to position and move the blade.

Tracking the position of the draft frame may improve or simplify the operation of the motor grader. Some motor graders use a sensor to help track the movement of one or more of the operational frames. The sensors may be calibrated so that they provide more accurate feedback. Accordingly, the disclosure provided herein describes systems and methods of calibrating one or more sensors of a motor grader.

SUMMARY

In one embodiment, a work vehicle includes a body, an operational frame movable relative to the body about a primary joint, a linkage arrangement configured to adjust a position of the operational frame relative to the body, and a working implement coupled to the operational frame and movable relative to the body. A first sensor is positioned on the body. A second sensor is positioned on at least one of the operational frame, the linkage arrangement, and the working implement. A processor is configured to receive a first signal from the first sensor, where the first signal is representative of a measurement sensed by the first sensor, receive a second signal from the second sensor, where the second signal is representative of a measurement sensed by the second sensor, and determine a measurement error of the first sensor based on the signals from the first sensor and the second sensor.

In another embodiment, a work vehicle includes a body, a working implement movable relative to the body, and a linkage arrangement configured to adjust a position of the working implement relative to the body, where the linkage arrangement includes a plurality of hydraulic cylinders each movable between an extended position and a retracted position to adjust a length thereof. A first sensor is positioned on the body. A second sensor is positioned on a first cylinder of the plurality of cylinders of the linkage arrangement, where the second sensor is configured to sense a parameter of the first cylinder. A processor configured to determine a measurement error of the first sensor based at least in part on a signal representative of a measurement sensed by the second sensor.

In yet another embodiment, a work vehicle includes a body, an operational frame movable relative to the body about a primary joint, a linkage arrangement configured to adjust a position of the operational frame relative to the body, and a working implement coupled to the operational frame and movable relative to the body. A user interface is configured to display information to an operator of the work vehicle. A first sensor is positioned on the body. A second sensor is positioned on at least one of the operational frame, the linkage arrangement, and the blade. A processor is configured to determine a measurement error of the first sensor based at least in part on a signal from the first sensor and a signal from the second sensor, and output a measurement error of the first sensor to the user interface.

Other aspects will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Terms of degree, such as "substantially," "about," "approximately," etc. are understood by those of ordinary skill to refer to reasonable ranges outside of the given value, for example, general tolerances associated with manufacturing, assembly, and use of the described embodiments.

In addition, it should be noted that a plurality of hardware and software based devices, as well as a plurality of different structural components may be utilized to implement embodiments described herein. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of embodiments described herein may be implemented in software (for example, stored on non-transitory computer-readable medium) executable by one or more processors. As such, it should be noted that a plurality of hardware and software based devices, as well as a plurality of different structural components may be utilized to implement the described embodiments. For example, "controller" and "control unit" described in the specification may include one or more electronic processors, one or more memory modules including non-transitory computer-readable medium, one or more input/output interfaces, and various connections (for example, a system bus) connecting the components.

DETAILED DESCRIPTION

Figure 1:
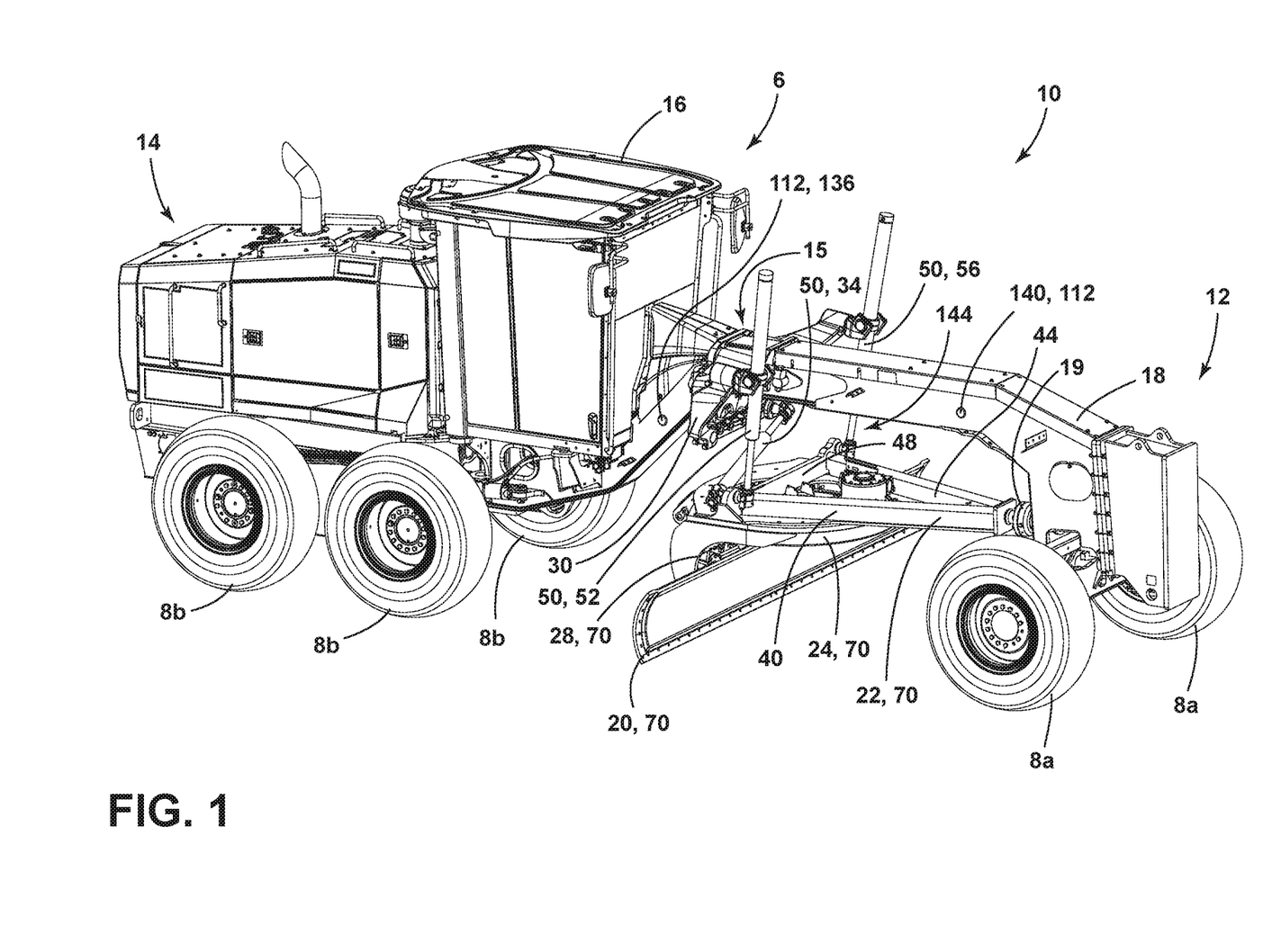
FIG. 1 is a perspective view of a motor grader according to one embodiment.
Figure 2:
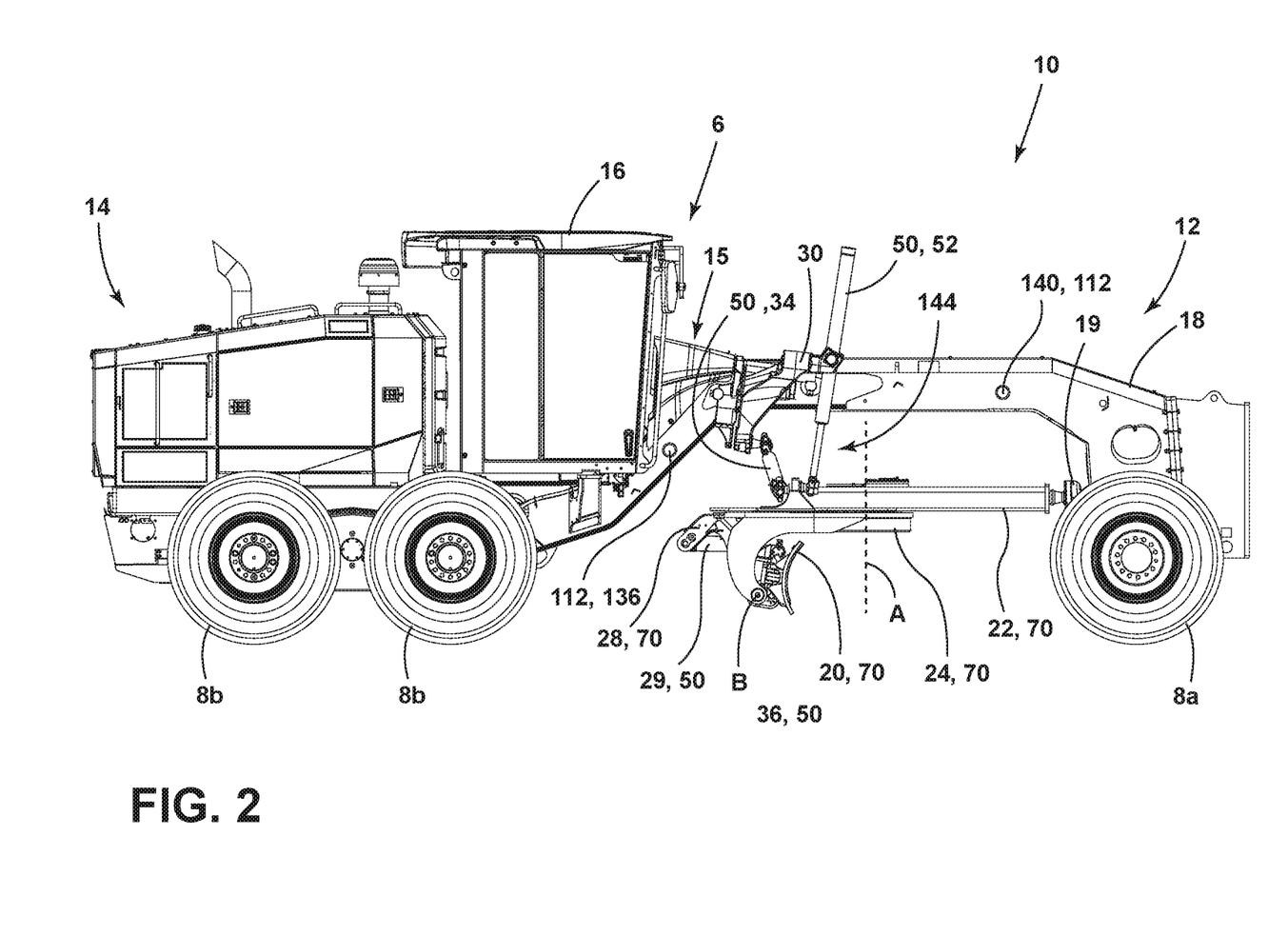
FIG. 2 is a side view of the motor grader of FIG. 1.
Figure 3:
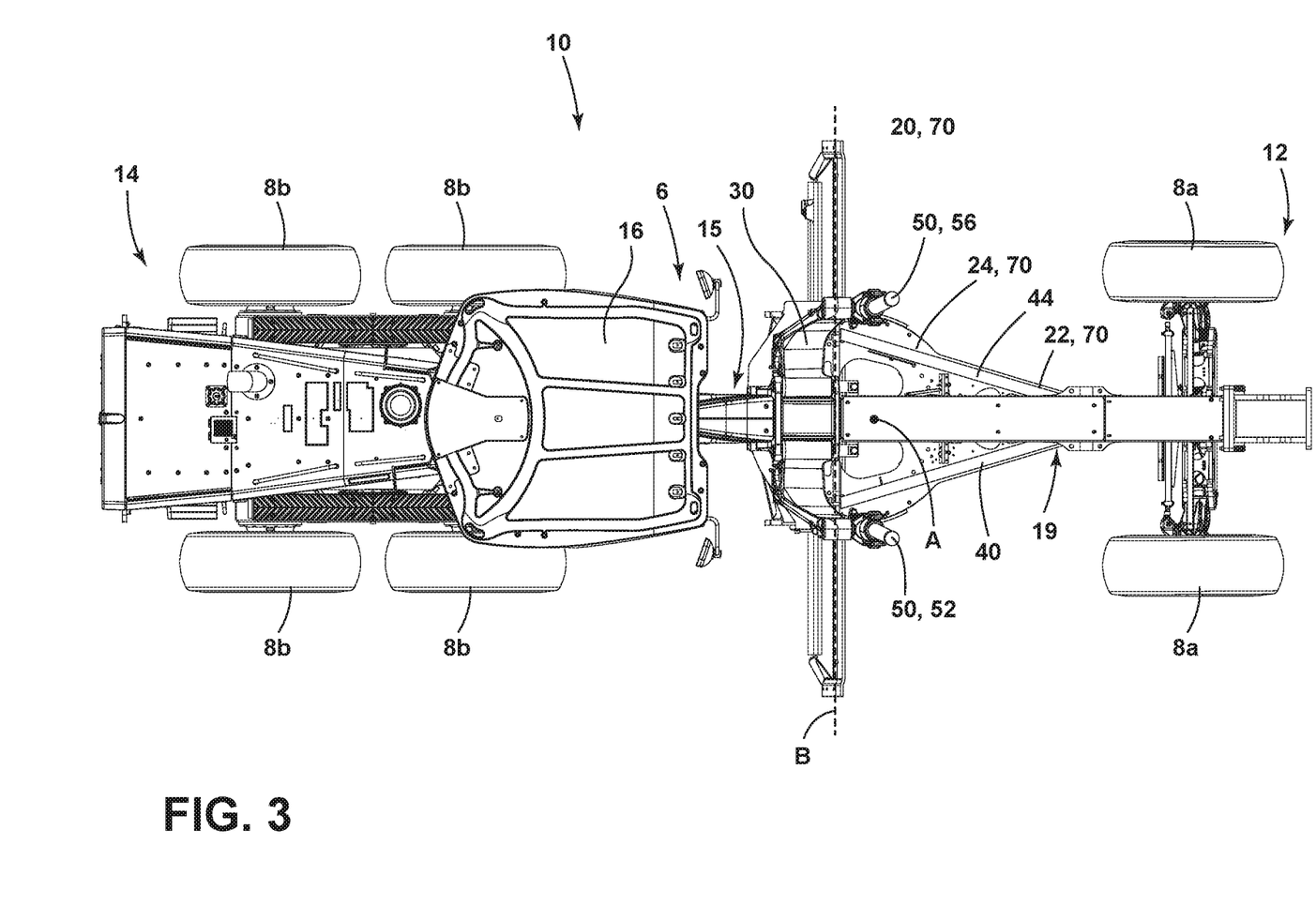
FIG. 3 is a top view of the motor grader of FIG. 1.

FIGS. 1-3 illustrate a work vehicle 10, and specifically, a motor grader 10. It should be understood that the illustrated motor grader 10 is provided as an example and embodiments described herein may be used with motor graders 10 or other work vehicles 10 that differ from the motor grader 10 illustrated in FIGS. 1-3.

The illustrated motor grader 10 has a body 6 with front and rear sections 12, 14. The front and rear sections 12, 14 are articulated relative to one another at an articulation joint 15 for steering of the motor grader 10. The motor grader 10 has six ground-engaging wheels 8. The front section 12 has two wheels 8a, a left front wheel 8a and a right front wheel 8a. The rear section 14 has four wheels 8b, two left rear wheels 8b arranged in tandem and two right rear wheels 8b arranged in tandem. The rear section 14 of the body 6 includes an internal combustion engine (e.g., diesel engine, not shown) to power the motor grader 10. The body 6 has an operator's station 16 from which a human operator can control the motor grader 10.

The front section 12 of the body 6 supports a working implement, such as a blade 20. In particular, the blade 20 is mounted to a main frame 18 of the front section 12. The blade 20 is configured for moving dirt or other material in order to create a desired contour of the ground surface over which the vehicle 10 travels. The blade 20 is mounted to the main frame 18 for movement in a number of directions, including translational movement, roll, pitch, and yaw. The blade 20 is mounted to the main frame 18 and movable relative to the main frame 18 via a draft frame 22, a circle frame 24, and a tilt frame 28. In particular, the blade 20 is coupled to the tilt frame 28. The tilt frame 28 is supported by the circle frame 24, which is in turn supported below the draft frame 22.

Figure 4:
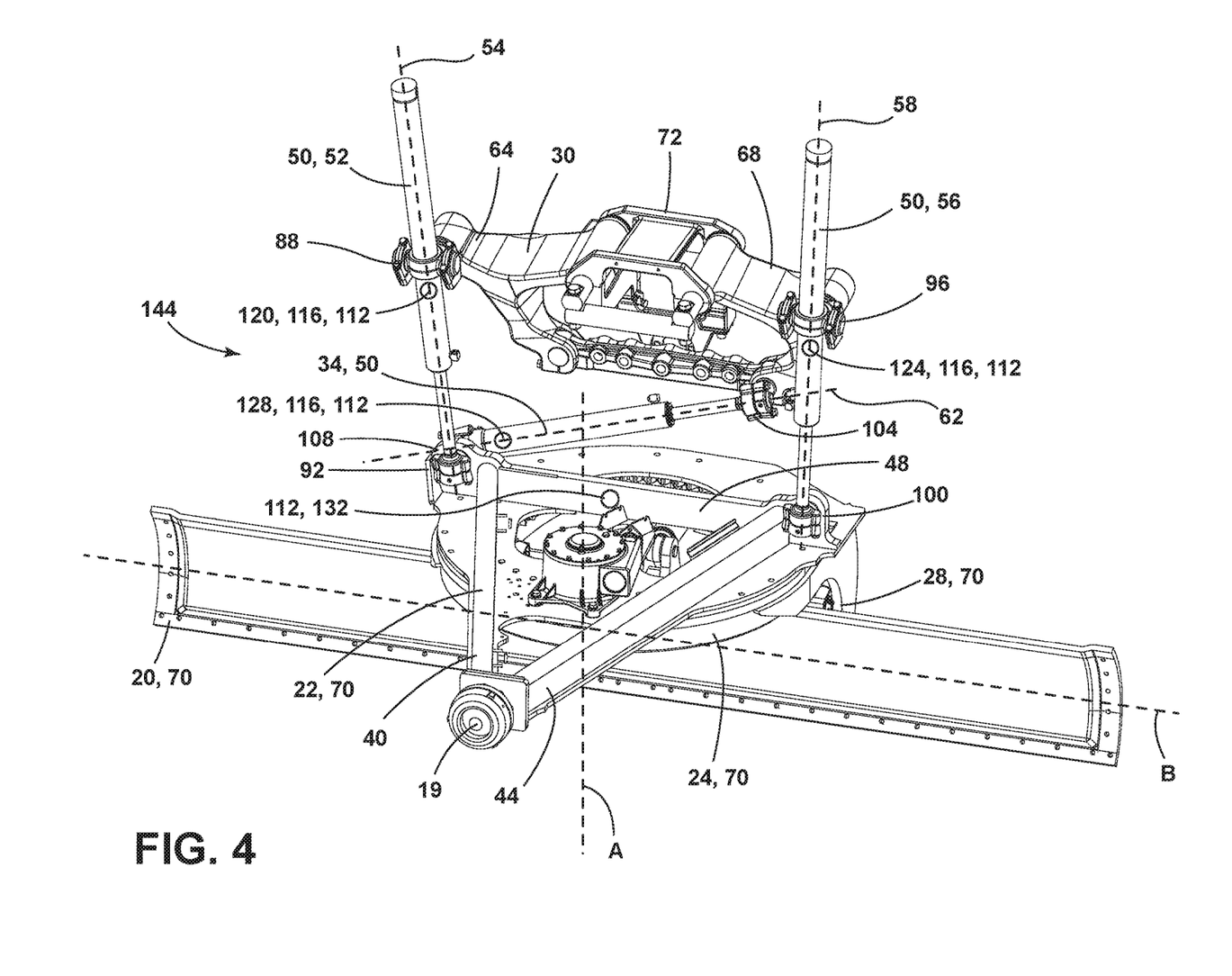
FIG. 4 is a front perspective view of the operational frames of the motor grader of FIG. 1.

With reference to FIGS. 3-4, the draft frame 22 is a generally triangular frame that extends below the main frame 18 from a front portion of the main frame 18 to a rear portion of the main frame 18. The triangular shape of the draft frame 22 is formed by a first draw bar 40, a second draw bar 44, and a cross bar 48. The draft frame 22 is coupled to the front portion of the main frame 18 by a ball joint 19, which enables the draft frame 22 to move in a plurality of different directions relative to the main frame 18. The ball joint 19 is formed at the intersection of the first draw bar 40 and second draw bar 44.

As shown in FIGS. 1-3, the draft frame 22 is coupled to the rear portion of the main frame 18 by a saddle 30, first and second lift cylinders 52, 56, and a circle side-shift cylinder 34. The saddle 30 is mounted to the main frame 18, and the first and second lift cylinders 52, 56 extend between the saddle 30 and the draft frame 22 to support the draft frame 22 below the saddle 30.

Figure 5:
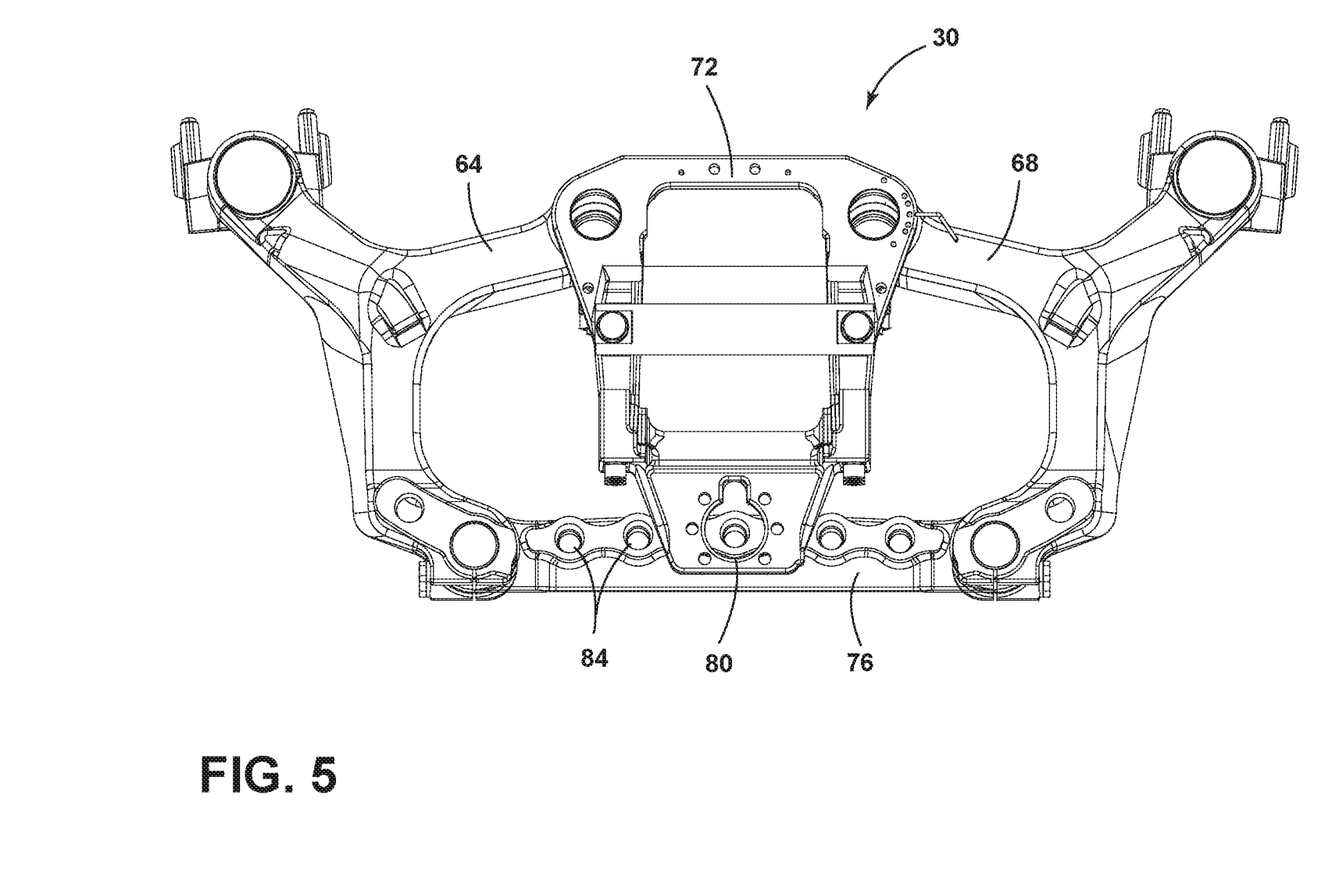
FIG. 5 is a detailed view of a saddle of the motor grader of FIG. 1.

FIG. 5 provides a detailed view of the saddle 30 according to one embodiment. The saddle 30 has a plurality of linkages, which can be adjusted to a predetermined number of discrete linkage arrangements. The illustrated saddle 30 includes four linkages (i.e., a 4-bar linkage system), including a first link arm 64, a second link arm 68, a center link 72, and a bar link 76. The center link 72 includes a pin 80, which can selectively engage with a plurality of positioning holes 84 in the bar link 76. Each of the positioning holes 84 corresponds to one discrete linkage arrangement. The pin 80 can be moved from one positioning hole 84 to another positioning hole 84 to adjust the saddle 30 to different linkages arrangements. In the illustrated embodiment, the saddle 30 has five positioning holes 84 corresponding to five different linkage arrangements. However, in other embodiments, a greater or fewer number of positioning holes 84 may be used to achieve a greater or lesser number of linkage arrangements.

Referring back to FIG. 4, the saddle 30 connects the draft frame 22 to the main frame 18 by way of the first lift cylinder 52, the second lift cylinder 56, and the circle side-shift cylinder 34. Specifically, the first lift cylinder 52 is connected to the saddle 30 at a first connection point 88 located on the first link arm 64 of the saddle 30 and is connected to the draft frame 22 at a second connection point 92 located proximate the intersection of the first draw bar 40 and the cross bar 48. Likewise, the second lift cylinder 56 is connected to the saddle 30 at a first connection point 96 located on the second link arm 68 of the saddle 30 and is connected to the draft frame 22 at a second connection point 100 located proximate the intersection of the second draw bar 44 and the cross bar 48.

In the illustrated embodiment, the first and second lift cylinders 52, 56 are hydraulic actuators capable of raising and lowering the draft frame 22, and thus the circle frame 24 and the blade 20, relative to the main frame 18. For example, the first and second lift cylinders 52, 56 can raise and lower the draft frame 22 (i.e., in a generally vertical direction relative to the ground) by raising or lowering both the sides of the draft frame 22. Additionally, the first and second lift cylinders 52, 56 can pivot (i.e., roll) the draft frame 22 by raising or lowering one side of the draft frame 22 relative to the other side. As an example, the first and second lift cylinders 52, 56 may be used to adjust the roll of the blade 20 in order to align the blade 20 with the cross slope of the ground surface, which is defined as the angle of the surface relative to gravity measured across the surface in a direction perpendicular to the direction of travel of the work machine 10.

The first and second lift cylinders 52, 56 raise and lower the draft frame 22 by moving along a stroke path from an extended position to a retracted position to adjust the length of the lift cylinders 52, 56. The operational length of the first and second lift cylinders 52, 56 determines the relative position of the draft frame 22 with respect to (i.e., below) the main frame 18. For example, the draft frame 22 is at its lowest position below the main frame 18 (i.e., farthest from the main frame 18) when the first and second lift cylinders 52, 56 are both fully extended to their greatest length. Contrarily, the draft frame 22 is at its highest position (i.e., closet to the main frame 18) when the first and second lift cylinders 52, 56 are fully retracted to their shortest length.

The length of the lift cylinders 52, 56 can be measured along the longitudinal axis 54, 58 of each cylinder 52, 56. In the illustrated embodiment, the lengths of the first and second lift cylinders 52, 56 are measured from the respective first connection point 88, 96 to the respective second connection point 92, 100 of each lift cylinder 52, 56.

With continued reference to FIG. 4, the circle side-shift cylinder 34 is also connected between the saddle 30 and the draft frame 22 to side-shift the draft frame 22, and in turn, the circle frame 24 and the blade 20, relative to the main frame 18. The circle side-shift cylinder 34 is a hydraulic actuator that can sweep the draft frame 22 laterally in a back and forth direction (i.e., in a generally horizontal direction relative to the ground). In addition to sweeping the draft frame 22 laterally, the circle side-shift cylinder 34 can also rotationally sweep the draft frame 22 in the yaw direction. Specifically, when the circle side-shift cylinder 34 works in conjunction with the circle frame 24, the lateral movement of the side-shift cylinder 34 combined with the rotational movement of the circle frame 24 affects the position of the draft frame 22 and blade 20 in the yaw direction.

Similar to the first and second lift cylinders 52, 56, the circle side-shift cylinder 34 is connected to the saddle 30 at a first connection point 104 located on the second link arm 68 of the saddle 30 and is connected to the draft frame 22 at a second connection point 108 located proximate the intersection of the first draw bar 40 and the cross bar 48 of the draft frame 22. In other embodiments, the circle side-shift cylinder 34 is connected to the first link arm 64 of the saddle 30 and is connected to the draft frame 22 at a location proximate the second draw bar 44.

The circle side-shift cylinder 34 shifts the draft frame 22 laterally by moving along a stroke path from an extended position to a retracted position to adjust the length of the circle side-shift cylinder 34. The length of the circle side-shift cylinder 34 determines how far the draft frame 22 is shifted relative to the main frame 18. With reference to FIG. 4, the draft frame 22 is shifted farthest to the left when the circle side-shift cylinder 34 is fully extended to its greatest length. Contrarily, the draft frame 22 is shifted farthest to the right when the circle side-shift cylinder 34 is fully retracted to its shortest length. Similar to the first and second lift cylinders 52, 56, the length of the circle side-shift cylinder 34 can be measured along the longitudinal axis 62 of the circle side-shift cylinder 34. In the illustrated embodiment, the length of the circle side-shift cylinder 34 is measured from the first connection point 104 to the second connection point 108.

It should be understood by those skilled in the art that the connection points of the left lift cylinder 52, the right lift cylinder 56, and the circle side-shift cylinder 34 can be positioned at different locations on the saddle 30 and the draft frame 22. Furthermore, in some embodiments, the connection points may be located on the circle frame 24, or other components of the motor grader 10 that enable the draft frame 22 to be supported below the main frame 18 and moveable relative thereto.

Figure 6:
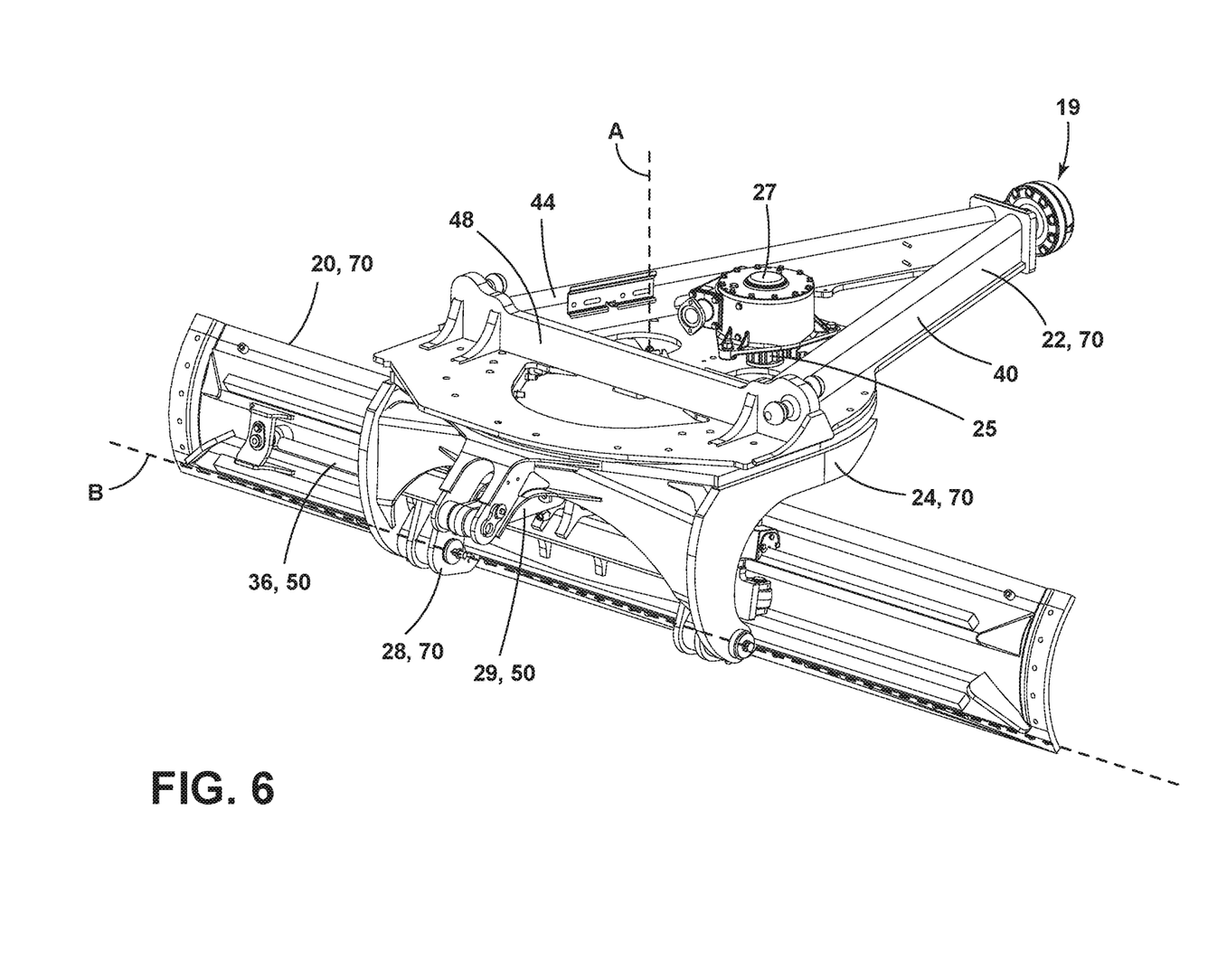
FIG. 6 is a rear perspective view of certain operational frames of the motor grader of FIG. 1.

Referring to FIGS. 3-4 and 6, the circle frame 24 is mounted to and extends below the draft frame 22. The circle frame 24 is configured to rotate relative to the draft frame 22 about a central axis A. The circle frame 24 is rotated by a circle gear 25 having a circle drive gearbox 27 engaging the circle gear 25. Rotation of the circle frame 24 rotates the tilt frame 28 and the blade 20 about the central axis A (i.e., yaw rotation). As previously mentioned, the position of the draft frame 22 in yaw motion may be affected by both the circle frame 24 and the circle side-shift cylinder 34.

The tilt frame 28 holds the blade 20 and is coupled to the circle frame 24 for pivotal movement of the tilt frame 28 and the blade 20 relative to the circle frame 24. Specifically, the tilt frame 28 can increase or decrease the pitch of the blade 20 by rotating the blade 20 about a tilt axis B by use of a tilt cylinder 29. The tilt cylinder 29 is another hydraulic actuator connected to the circle frame 24 and the tilt frame 28. The tilt cylinder 29 increases or decreases the pitch of blade 20 by moving along a stroke path from an extended position to a retracted position to adjust the length of the tilt cylinder 29.

Additionally, a blade side-shift cylinder 36 is connected to the tilt frame 28 and the blade 20, and is operable to move the blade 20 in translation relative to the tilt frame 28 along a longitudinal axis of the blade 20 (i.e., in a generally horizontal direction relative to the ground). In the illustrated embodiment, the longitudinal axis of the blade coincides with axis B. In the illustrated embodiment, the longitudinal axis of the blade 20 is parallel to the tilt axis B. The blade side-shift cylinder 36 translates the blade 20 from side to side by moving along a stroke path from an extended position to a retracted position to adjust the length of the blade side-shift cylinder 36.

As will be described in greater detail below, the length of the cylinders 29, 34, 52, and 56 (identified generally as cylinders 50) can be used to help determine the position of the blade 20 relative to the main frame 18. When using the length(s) of the cylinder(s) 50 as a one of the variables to help determine the position of the blade 20, it will be understood that the length of the cylinders 50 can be measured in different ways (e.g., using different end points, so long as one end point moves relative to the other). Alternatively, the change in length may be used in place of the length.

As described above, the operational frames 70 of the motor grader 10, such as the draft frame 22, circle frame 24, or the tilt frame 28 can be moved in a plurality of different directions. For example, the blade 20 can be translated in a vertical or a horizontal direction and can be rotated in roll, pitch, or yaw.

The illustrated motor grader 10 includes a sensor arrangement (sensors identified generally as 112) to track the position and movement of the blade 20 relative to the main frame 18. As described in further detail below, the sensor arrangement can also be used to calibrate one or more of the sensors within the sensor arrangement. In other words, one or more of the on board sensors 112 (i.e., local sensors) can be used to calibrate another one of the on board sensors 112, as opposed to using external sensors (i.e., sensors that are not located on the motor grader) to calibrate an on board sensor 112.

With reference to FIGS. 3-4, the motor grader 10 may include a plurality of cylinder sensors 116 ("the cylinder sensors 116") that each monitor a parameter of a corresponding cylinder 50 related to the length of that cylinder 50. For example, the motor grader 10 may include first and second sensors 120, 124 on the first and second lift cylinders 52, 56. The first and second sensors 120, 124 track the position of the first and second lift cylinders 52, 56 along the stroke path to determine the extent to which the lift cylinders 52, 56 are extended or retracted. Thus, the first and second sensors 120, 124 are used to determine the length of the cylinders 52, 56 based on the length of extension of the cylinders 52, 56. In the illustrated embodiment, the first and second sensors 120, 124 are linear position sensors 112 or encoders. However, in other embodiments, the first and second sensors 120, 124 can be other types of sensors 112 that indicate the position of the left and right lift cylinders 52, 56 such that the length of the cylinder 52, 56 can be determined. For example, the first and second sensors 120, 124 may be position sensors 112, which represent a location along the axis 54, 58 of the associated cylinder 52, 56. The first and second sensors 120, 124 may be used to determine a change in cylinder length, for example, by identifying a change in location along the axis 54, 58 of the associated cylinder 52, 56. The first and second sensors 120, 124 may be pressure sensors used to determine a change in cylinder length by measuring the amount of hydraulic fluid that is pumped through the cylinder.

Similarly, the motor grader 10 includes a third sensor 128 located on the circle side-shift cylinder 34. The third sensor 128 tracks the position of the circle side-shift cylinder 34 along the stroke path to determine the length of the circle side-shift cylinder 34, and thus, provides some information regarding the extent to which the circle frame 24 is rotated in the yaw direction. (note: determination of the rotation in the yaw direction can be determined with additional information regarding the rotation of the circle frame 24). In the illustrated embodiment, the third sensor 128 is a linear position sensor 112 or encoder. However, in other embodiments, the third sensor 128 can be another type of sensor 112 that indicates the position of the circle side-shift cylinder 34. For example, the third sensor 128 may be any of the sensors 112 configured to measure a parameter related to the length of a cylinder, as described above with respect to the first and second sensors 120, 124.

Additionally, in some embodiments, the motor grader 10 includes a fourth sensor 132 on the circle frame 24. The fourth sensor 132 can be used to determine the degree to which the circle frame 24 is rotated about the central axis A. In the illustrated embodiment, the fourth sensor 132 is a rotary sensor, magnetic sensor, angular encoder, or another type of sensor 112 capable of determining the degree of rotation of the circle frame 24.

As shown in FIG. 2, the motor grader 10 includes a fifth sensor 136 located on the rear section 14 of the body 6. Specifically, in the illustrated embodiment, the fifth sensor 136 is positioned on the main frame 18, however, in other embodiments, the fifth sensor 136 may be positioned in other locations on the body 6. The fifth sensor 136 can be an inertial sensor 112 that is capable of providing a reference with respect to gravity. The fifth sensor 136 may also be capable of sensing the roll and/or pitch of the main frame 18. In the illustrated embodiment, the fifth sensor 136 is an inertial measurement unit (IMU). As will be described in further detail below, the IMU sensor 136 can be calibrated using the other sensors 112 in the sensor arrangement.

The motor grader 10 may also include a sixth sensor 140 positioned downstream of the fifth sensor 136, for example, on the draft frame 22, circle frame 24, or tilt frame 28. The sixth sensor 140 may be an inertial sensor 112 capable of identifying relative movement between the sixth sensor 140 and another sensor, such as the fifth sensor 136. As will be explained in greater detail below, the fifth sensor 136 and the sixth sensor 140 may be used to sense movement (including unintentional movement) between the main frame 18 and the draft frame 22 (or circle frame 24 or tilt frame 28, depending on the location of the sixth sensor).

As will be understood by a person of ordinary skill in the art, the aforementioned sensors 112 may be a variety of different sensors 112 capable of performing the function described herein. Additionally, it should be understood that the motor grader 10 may include a greater or fewer number of sensors 112, or a different combination of sensors 112 than those discussed above. For example, in some embodiments, the motor grader 10 may include more than one sensor or more than one type of sensor in place of one of the sensors 112 discussed herein. In other embodiments, one or more of the sensors 112 may be excluded from the motor grader 10. In some embodiments, one or more sensors 112 may be replaced by a user input that can be manually input by an operator of the motor grader 10 via a user interface. Alternatively, one or more sensors may be replaced by machine logic or other control systems to identify a parameter that would otherwise be measured by a sensor 112 described herein.

Figure 7:
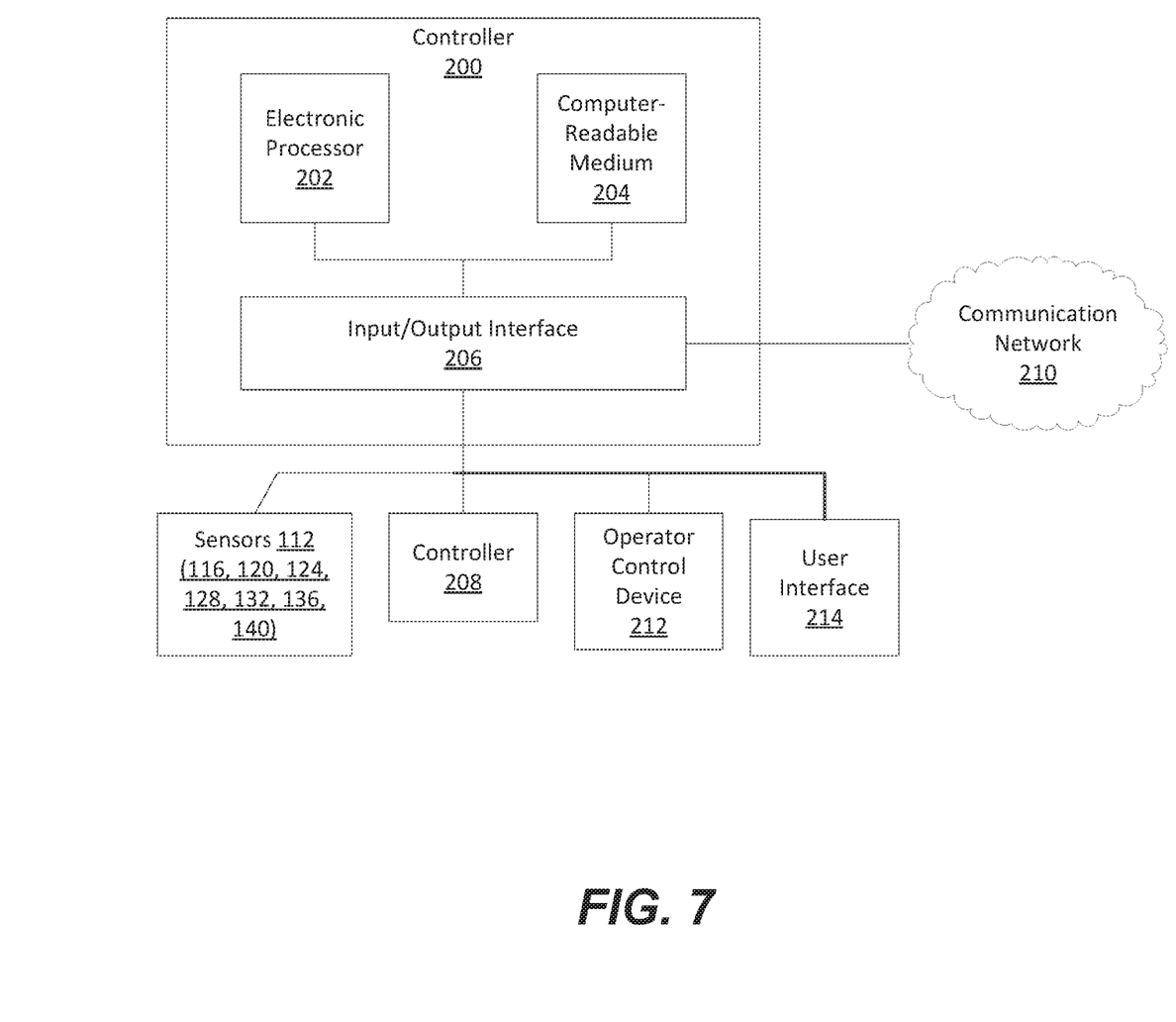
FIG. 7 is a schematic diagram of a control system according to one embodiment.

With reference to FIG. 7, the motor grader 10 also includes one or more controllers 200 for controlling the components of the motor grader 10. For example, FIG. 7 schematically illustrates a controller 200 included in the motor grader 10 according to one embodiment. As illustrated in FIG. 7, the controller 200 includes an electronic processor 202 (for example, a microprocessor, application specific integrated circuit (ASIC), or other electronic device), an input/output interface 206, and a computer-readable medium 204. The electronic processor 202, the input/output interface 206, and the computer-readable medium 204 are connected by and communicate through one or more communication lines or busses. It should be understood that the controller 200 may include fewer or additional components than those illustrated in FIG. 7 and may include components in configurations other than the configuration illustrated in FIG. 7. Also, the controller 200 may be configured to perform additional functionality than the functionality described herein. Additionally, the functionality of the controller 200 may be distributed among more than one controller 200. For example, the controller 200 may communicate with one or more additional controllers 208. The additional controllers 208 may be internal or external to the controller 200. Likewise, the functionality described herein as being performed by the electronic processor 202 may be performed by a plurality of electronic processors included in the controller 200, a separate device, or a combination thereof. Furthermore, in some embodiments, the controller 200 may be located remote from the motor grader 10.

The computer-readable medium 204 includes non-transitory memory (for example, read-only memory, random-access memory, or combinations thereof) storing program instructions (software) and data. The electronic processor 202 is configured to retrieve instructions and data from the computer-readable medium 204 and execute, among other things, the instructions to perform the methods described herein. The input/output interface 206 transmits data from the controller 200 to external systems, networks, devices, or a combination thereof and receives data from external systems, networks, devices, or a combination thereof. The input/output interface 206 may also store data received from external sources to the computer-readable medium 204, provide received data to the electronic processor 202, or both. In some embodiments, as illustrated in FIG. 7, the input/output interface 206 includes a wireless transmitter that communicates with a communication network 210.

The controller 200 may communicate with one or more sensors 112 (for example, through the input/output interface 206). The controller 200 is configured to receive information from the sensors 112 related to the position of the draft frame 22 and use the received information to track the position of the draft frame 22 relative to the main frame 18. In some embodiments, the controller 200 communicates with the sensors 112 over a wired or wireless connection directly or through one or more intermediary devices, such as another controller 200, an information bus, the communication network 210, and the like. Similarly, the controller 200 may communicate with one or more additional controllers 208 associated with the motor grader 10. In some embodiments, the additional controller 208 may communicate with the sensors 112 and may act as an intermediary device between the controller 200 and the sensors 112.

One or more of the controllers 200 or 208 may also be configured to operate components of the motor grader 10. For example, the controller 200 may be configured to control the operational frames 70 of the motor grader 10, such as controlling the movement of the draft frame 22, the circle frame 24, or the tilt frame 28. More specifically, the controller 200 may control the components of the motor grader 10 by controlling one or more of the first and second cylinders 52, 56, the circle side-shift cylinder 34, the circle gear 25, the tilt cylinder 29, or the side-shift cylinder 36. The controller 200 may be configured to determine a position of the one or more of the operational frames relative to the main frame 18.

In some embodiments, the controller 200 also receives input from one or more operator control devices 212 (for example, a joystick, a lever, a button, a foot pedal, another actuator operated by the operator to control the operation of the motor grader 10, or a combination thereof). For example, an operator may use the operator control devices 212 to operate the motor grader 10, including commanding movement of the draft frame 22, the circle frame 24, the tilt frame 28, or the blade 20. In some embodiments, the controller 200 also communicates with one or more user interfaces 214 (for example, through the input/output interface 206), such as a display device or a touchscreen. The user interfaces 214 may display feedback to an operator. For example, user interfaces 214 may provide information regarding the position of the draft frame 22, the circle frame 24, the tilt frame 28, or the blade 20. Also, in some embodiments, the user interfaces 214 allow an operator to input data, such as operational data or instructions for the motor grader 10. For example, the operator may input data regarding the saddle 30 linkage arrangement being used, the desired position of the draft frame 22, or data related to the cross slope angle or other topographic or environmental factors.

The controller 200 is configured to perform a method of tracking and/or controlling the position of at least one operational frame 70 (i.e., the draft frame 22, the circle frame 24, the tilt frame 28, or the blade 20) relative to the main frame 18.

In the illustrated embodiment, the controller 200 tracks the position of the blade 20 by tracking the position of the draft frame 22. Specifically, the controller 200 is configured to track the position and/or orientation of the draft frame 22 by tracking the position of the cylinders that control the draft frame 22 (i.e., the first lift cylinder 52, the second lift cylinder 56, and the circle side-shift cylinder 34). As the cylinders 52, 56, 29, 34 each move between an extended position and a retracted position, the length of each cylinder 52, 56, 34 increases or decreases, affecting the position and/or orientation of the draft frame 22. Thus, the controller 200 can track the cylinders 52, 56, 34 along the path of their stroke length in order to determine the position of the draft frame 22 relative to the main frame 18. Once the controller 200 has determined the position of the draft frame 22, the controller can determine the position of the blade 20 relative to the draft frame 22, and thus, relative to the main frame 18. The controller 200 determines the position of the blade 20 by tracking the position of the tilt cylinder 29 and the blade side-shift cylinder 36 and the angle of rotation of the circle frame 24. The controller 200 thus utilizes information from the various sensors 112 in order to track the position of the draft frame 22 and ultimately the position of the blade 20 relative to the body 6 of the motor grader 10.

Tracking the position of the draft frame 22 based on the position of the cylinders 50 can be a complex task, due to the large number of degrees of freedom, as well as the arrangement of the cylinders 50. Specifically, the draft frame 22 has three degrees of freedom about the ball joint 19 (i.e., the primary joint) and two angular degrees of freedom for each of the cylinders 50 (i.e., the first and second lift cylinders 52, 56 and the circle side-shift cylinder 34). Furthermore, the cylinders 50 together form a parallel linkage system 144 (FIG. 4), making the coordinates of the draft frame 22 more difficult to determine.

A method of tracking the operational frames 70 is more fully described in U.S. application Ser. No. 16/130,743 and U.S. application Ser. No. 16/130,741, both of which are fully incorporated by reference herein. Specifically, these applications provide a detailed description of the linkage arrangement of the cylinders, the draft frame, the circle frame, the tilt frame, and the blade, as well as a method of determining the position of the blade. The linkage arrangement and the sensor arrangement (as described above) enable the controller to calculate the position and orientation of the cylinders and the various operational frames.

The controller 200 is also configured to calibrate at least one of the sensors 112 in the sensor arrangement using other sensors 112 in the sensor arrangement. In other words, the same sensors system used to track the position of the operational frame 70 (as described in U.S. application Ser. No. 16/130,743 and U.S. application Ser. No. 16/130,741) can also be used to calibrate a sensor 112 within the sensor arrangement.

At times, one or more of the sensors 112 may be calibrated in order to provide accurate information to the controller 200. For example, in some embodiments, it may be necessary to calibrate the position and orientation of the fifth sensor 136 when it is mounted to the main frame 18 during manufacture. The fifth sensor 136 (e.g., the IMU) may be used to provide a reference with respect to gravity and is capable of sensing the roll and/or pitch of the main frame 18. Accordingly, in order to obtain a more accurate reference point to measure the roll and pitch, the fifth sensor 136 may be calibrated to decrease error in its measurements. For example, the fifth sensor 136 may be calibrated to identify the most effective mounting position or orientation on the main frame 18, permitting re-positioning to improve the accuracy of the information sensed by the fifth sensor 136.

Alternatively, the measurements sensed by the fifth sensor 136 can be adjusted during the calculation or control process to account for any error.

Typically, when calibrating a sensor on a motor grader, external devices, such as sensors and measuring devices are used to calibrate the sensor. This may require a person to walk around the motor grader and take various measurements using an external sensor (i.e., a sensor not position on the motor grader 10) and other measurement devices. In addition, some previous methods require the motor grader 10 to be turned around and placed in the same spot in order to average out measurement error. Moreover, during these prior calibration processes, the motor grader could be subjected to extreme positions, such as being rotated to the maximum degree, in order to obtain an average for each rotational axis.

The system and method discussed herein uses one or more of the on board sensors 112 to calibrate another one of the on board sensors 112, without the use of external sensors. The motor grader 10 does not have to be subjected to extreme positions or turned around in order to complete the calibration process. Furthermore, the calibration method described enables the error to be determined in all three rotational directions, including roll, pitch, and yaw.

The system and method of calibrating a sensor discussed herein is described with respect to calibration of the sixth sensor 136 (i.e., the IUM sensor). However, as will be understood, the same or a similar method can be used to calibrate other sensors 112 in the sensor arrangement.

Figure 8:
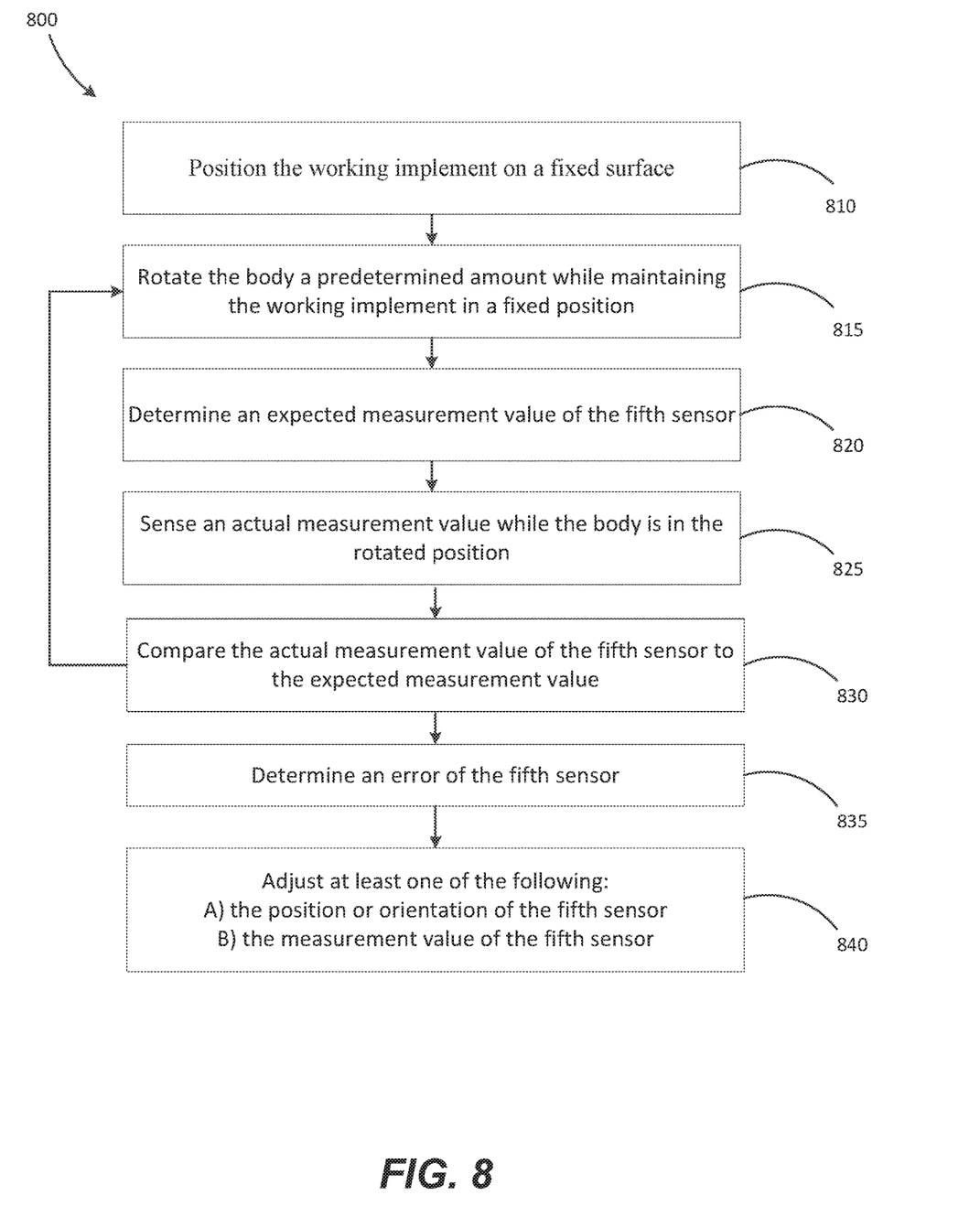
FIG. 8 is a flow chart of a method of calibrating a sensor on a work vehicle.

During the manufacturing process, the fifth sensor 136 (i.e., the IUM sensor 136) is mounted to the main frame 18. The fifth sensor 136 is then calibrated to ensure that it is positioned in the center of the main frame 136 and is oriented straight (i.e., not tilted or twisted). FIG. 8 provides one embodiment of a method 800 of calibrating the fifth sensor 136 using the other sensors 112 in the sensor arrangement. The method 800 includes positioning the working implement on a fixed surface (Step 810). For example, the blade 20 is positioned on a flat ground surface. The body 6 of the motor grader 10 is then rolled a predetermined amount in a first direction while keeping the blade 20 in a fixed position (Step 815). For example, in some embodiments, the body 6 may be rolled 10 degrees towards the left. Specifically, the body 6 is rolled by maintaining the blade 20 on the fixed surface and adjusting the lengths of the cylinders 50 to achieve a predetermined roll. In the illustrated embodiment, only the front portion 12 of the body 6, which includes the main frame 18, is rolled. However, in other embodiments, the entire body 6 may be rolled. Similarly, when the method 800 is used to calibrate other types of work vehicles 10, a whole or a portion of the body of the work vehicle may be rolled.

As described above, the lengths of the cylinders 50 and the known motor grader 10 geometry (e.g., the geometry of the linkage arrangement) can be used to track the position of the blade 20 relative to the main frame 18. Accordingly, the same system can be used in reverse to determine and/or control the position of the body 6 relative to the blade 20 by holding the blade 20 in a fixed position and moving the body 6 of the motor grader 10. More specifically, the cylinders 50 are adjusted to the respective lengths corresponding to a predetermined roll of the motor grader 10. The cylinder sensors 116 are also used to identify when these lengths are achieved. In the illustrated embodiment, the controller 200 communicates with the cylinder sensors 116 to adjust the lengths of the cylinders 50 and confirm that the motor grader 10 rotated to the predetermined roll.

The controller 200 is configured to determine an expected measurement value of the fifth sensor 136 corresponding to the motor grader 10 being rolled to the predetermined amount (Step 820). In other words, when the motor grader 10 is rolled a predetermined amount, the fifth sensor 136 is expected to sense a measurement corresponding to the machine geometry at a predetermined roll. The controller 200 can calculate the expected measurement value of the fifth sensor 136 based on the known lengths of the cylinders 50 and the known geometrical relationships between the linkages. Specifically, lengths of the cylinders 50 are known from the cylinder sensors 116 providing information to the controller 200 to identify the lengths of the cylinders. In addition, the controller 200 may receive information from some of the other sensors 112 in the sensor arrangement to help determine the expected measurement value of the fifth sensor 136. For example, the controller 200 may receive a signal from the fourth sensor 132 on the circle frame 24.

The controller 200 is configured to communicate with the fifth sensor 136 to receive an actual measurement value sensed by the fifth sensor 136 (Step 825). This measurement is taken while the motor grader is still rolled in the first direction. In some embodiments, the order of Steps 820 and 825 is reversed. The controller 200 then compares the actual measurement value of the fifth sensor 136 to the expected measurement value (Step 830).

In the illustrated embodiment, Steps 815-830 are then repeated. In the illustrated embodiment, the body 6 of the motor grader 10 is rolled a predetermined amount in a second direction (e.g., towards the right) while keeping the blade 20 in a fixed position (Step 810). For example, the body 6 may be rolled 10 degrees towards the right. Again the lengths of the cylinders 50 and the motor grader 10 geometry are used to achieve the predetermined roll. The controller 200 may communicate with the cylinder sensors 116 to adjust the cylinders 50 to the respective lengths corresponding to a predetermined roll.

The controller 200 is then configured to determine an expected measurement value of the fifth sensor 136 corresponding to the roll of the motor grader 10 in the second direction (Step 820). The controller 200 uses the motor grader 10 geometry, such as the linkage arrangement described above, and the information from the sensors 112 to determine the expected measurement value of the fifth sensor. Specifically, the controller 200 can determine an expected measurement value by using a similar method as described in U.S. application Ser. No. 16/130,743 and U.S. application Ser. No. 16/130,741, which are both fully incorporated herein. Specifically, U.S. application Ser. No. 16/130,743 and U.S. application Ser. No. 16/130,741 describe a unique method of tracking the position of the draft frame 18 and the blade 20 that uses the motor grader 10 geometry and information from the sensors to determine the position of the blade. In the method 800 described herein, the controller 200 uses similar information and algorithms to execute the calculations described in these applications. In the method described in the '743 and the '741 Applications, the measurement value sensed by the fifth sensor 136 is considered to be a known value and the position of the blade 20 is an unknown value that is being solved for. In the present disclosure, the position of the blade 20 is known, and the controller 200 is determining the unknown value of the fifth sensor 136 (i.e., the expected measurement value). Consequently, the present disclosure provides a unique method of calibrating the fifth sensor 136 (i.e., a first on board sensor) using the other on board sensors and the geometry of the motor grader 10.

The controller 200 also communicates with the fifth sensor 136 to and receives an actual measurement value (Step 825). The controller 200 compares the actual measurement value taken by the fifth sensor 136 with the expected measurement value (Step 830).

Again, the Steps 815-830 may be repeated as many times as needed. In some embodiments, the body 6 of the motor grader 10 may be rolled in different increments each time Steps 815-830 are repeated. For example, in one embodiment the body 6 may be rolled towards the left 8 degrees, then rolled towards the right 8 degrees, then rolled towards the left 12 degrees, and finally, rolled towards the right 12 degrees. Furthermore, it is to be understood that the Steps 815-830 may be repeated by rolling the body 6 in the first direction multiple times or by alternating between the first direction and the second direction. Additionally, the number of times the Steps 815-830 are repeated may vary.

The Steps 815-830 can be repeated one or more times to confirm an error of the fifth sensor 136 (Step 835). For example, Steps 815-830 may be repeated using different degrees of rotation to recalculate the error of the fifth sensor 136. The following illustrates a simplified example of how the error of the fifth sensor 136 may be determined. The body 6 is rolled 10 degrees towards the left (i.e., the first expected measurement value is 10 degrees) but the fifth sensor 136 senses an actual measured value corresponding to the body being rolled 12 degrees. Then the body 6 is rolled 10 degrees towards the right (i.e., the second expected measurement value is 10 degrees) but the fifth sensor 36 senses an actual measured value corresponding to the body being rolled 8 degrees. The controller 200 can determine that there is an error in the measurements taken by the fifth sensor 136, and that the actual measured values are off by 2 degrees to the left.

In some embodiments, the controller 200 may output an error result via the user interface 214. This method 800 reduces the need for a person to take physical measurements to calibrate the fifth sensor 136.

Once the error is determined (Step 835), the error can be accounted for or adjusted in a number of different ways (Step 840). In some embodiments, the controller 200 can adjust the measurements taken by the fifth sensor 136 during other operations and calculations (Step 840). For example, continuing from the example above, once the controller 200 determines that the fifth sensor 136 is off by 2 degrees, the controller 200 can add or subtract 2 degrees from the measurements taken by the fifth sensor 136 before using that measurement in further calculations or control operations. For example, when the controller 200 is operating under normal conditions and is using the fifth sensor 136 to help track the position of the blade 20, the controller 200 can be configured to automatically add or subtract the error (e.g., 2 degrees) from the measurements of the fifth sensor 136 before calculating the position of the blade 20.

Alternatively, the error of the fifth sensor 136 can be adjusted for by physically re-orienting the fifth sensor 136 on the motor grader 10. For example, if the fifth sensor 136 has an error of 2 degrees, it can be repositioned to off-set the 2 degree error.

The method 800 was described with respect to rolling the body 6 and determining an error measurement of the fifth sensor 136 along the axis that corresponds to roll. However, the method 800 can also be used to determine an error in the fifth sensor 136 along the axis that corresponds to pitch. In fact, in some embodiments, the Steps 815-830 are first executed to determine an error in the roll direction, and then the Steps 815-830 are repeated to determine an error in the pitch direction. For example, the body 6 may be pitched in a first direction (e.g., rotated forward) a predetermined amount while maintaining the blade 20 in a fixed position (Step 815). The controller 200 can then determine an expected measured value of the fifth sensor 136 (Step 820), receive an actual measured value of the fifth sensor 136 (Step 825), and compare the actual measured value to the expected measured value (Step 830). The body 6 can then be pitched in a second direction (e.g., rotated backwards) a predetermined amount while maintaining the blade 20 in a fixed position (Step 815). The controller 200 can then determine an expected measured value of the fifth sensor 136 (Step 820), receive an actual measured value of the fifth sensor 136 (Step 825), and compare the actual measured value to the expected measured value (Step 830).

Based on the compared values, the controller 200 can determine an error in the fifth sensor 136 in the pitch direction (Step 835). The error of the fifth sensor 136 can be accounted for and adjusted by repositioning the fifth sensor 136 on the motor grader or by adjusting the measurement value of the fifth sensor 136 prior to using the measurement value in further calculations or control steps (Step 840).

Furthermore, in some embodiments, the method 800 described herein allows the fifth sensor 136 to be calibrated for multiple rotational axes at the same time. For example, when the body 6 is rotated while maintaining the working implement in a fixed position (815), then controller 200 can be configured to execute steps 820-830 for multiple rotational axes at the same time. In other words, while the body 6 is rotated a predetermined amount, the controller 200 can determine an expected measurement value of the fifth sensor 136 for both roll and pitch (Step 820). The controller 200 can also receive a signal from the fifth sensor 136 that includes an actual measurement value for both roll and pitch (Step 825). The controller 200 can then compare the respective roll values and the respective pitch values (Step 830) to ultimately determine an error of the fifth sensor 136 in the roll direction and the pitch direction (Step 835). These error values can also be used to calculate an error in the yaw direction. Accordingly, the method 800 would enable the controller 200 to determine an error in the measurements taken by the fifth sensor 136 in all three rotational directions.

Thus, FIG. 8 provides a system and method of calibrating the fifth sensor using the motor grader 10 geometry and the information sensed by the other sensors 112 on board the motor grader 10. The method 800 reduces the need for a person to manually take measurements with external sensors and measuring devices. The method 800 also reduces the need to turn the motor grader 10 around to different positions in order to obtain an average error. Furthermore, the method 800 is capable of providing an error value for all three axes (i.e., rotational directions roll, pitch, and yaw).

Although the disclosure has been described in detail with reference to certain preferred embodiments, variations and modifications exist within the scope and spirit of one or more independent aspects of the disclosure as described. Various features and advantages of the disclosure are set forth in the following claims.

What is claimed is:

1. A work vehicle comprising:
   a body;
   an operational frame movable relative to the body about a primary joint;
   a linkage arrangement configured to adjust a position of the operational frame relative to the body;
   a working implement coupled to the operational frame and movable relative to the body;

a first sensor positioned on the body;
a second sensor positioned on at least one of the operational frame, the linkage arrangement, and the working implement; and
a processor configured to
  receive a first signal from the first sensor, the first signal representative of a measurement sensed by the first sensor,
  receive a second signal from the second sensor, the second signal representative of a measurement sensed by the second sensor, and
  determine a measurement error of the first sensor based on the signals from the first sensor and the second sensor.

2. The work vehicle of claim 1, wherein the processor is further configured to calculate an expected measurement value based on the signal from the second sensor, and wherein the processor is configured to determine the measurement error of the first sensor by comparing the signal from the first sensor to the expected measurement value.

3. The work vehicle of claim 1, wherein the measurement error represents an error in a measurement taken by the first sensor in a first direction, and wherein the processor is further configured to determine a second measurement error representative of a measurement taken by the first sensor in a second direction.

4. The work vehicle of claim 3, wherein the measurement error in the first direction is representative of an error in the measured roll of the work vehicle, and wherein the second measurement error in the second direction is representative an error in the measured pitch direction.

5. The work vehicle of claim 4, wherein the processor is further configured to determine a third measurement error representative of a measurement taken in the yaw direction.

6. The work vehicle of claim 1, wherein the processor is further configured to automatically adjust a measurement value sensed by the first sensor based on the measurement error of the first sensor.

7. The work vehicle of claim 1, wherein the linkage arrangement includes a plurality of hydraulic cylinders, the work vehicle further including a third sensor associated with one cylinder of the plurality of cylinders, and a fourth sensor associated with another cylinder of the plurality of cylinders, wherein the third sensor and the fourth sensor are each configured to sense a parameter relating to a length of the corresponding cylinder.

8. A work vehicle comprising:
a body;
a working implement movable relative to the body;
a linkage arrangement configured to adjust a position of the working implement relative to the body, the linkage arrangement including a plurality of hydraulic cylinders, each movable between an extended position and a retracted position to adjust a length thereof;
a first sensor positioned on the body;
a second sensor positioned on a first cylinder of the plurality of cylinders of the linkage arrangement, the second sensor configured to sense a parameter of the first cylinder; and
a processor configured to determine a measurement error of the first sensor based at least in part on a signal representative of a measurement sensed by the second sensor.

9. The work vehicle of claim 8, wherein the processor is configured to determine
  the measurement error of the first sensor by
  receiving a first signal from the first sensor, the first signal including a measurement sensed by the first sensor when the body is rotated in a first direction relative to the working implement,
  receiving a second signal from the second sensor, the second signal representative of a measurement sensed by the second sensor when the body is rotated in the first direction relative to the working implement,
  receiving a third signal from the first sensor, the third signal representative of a measurement sensed by the first sensor when the body is rotated in a second direction relative to the working implement, and
  receiving a fourth signal from the second sensor, the second signal representative of a measurement sensed by the second sensor when the body is rotated in the second direction relative to the working implement.

10. The work vehicle of claim 8, wherein the measurement error represents an error in a measurement taken by the first sensor in a first direction, and wherein the processor is further configured to determine a second measurement error representative of a measurement taken by the first sensor in a second direction.

11. The work vehicle of claim 8, wherein the processor is configured to determine the measurement error of the first sensor by calculating an expected measurement value based on the signal from the second sensor.

12. The work vehicle of claim 11, wherein the processor is configured to determine the measurement error of the first sensor by comparing a measurement sensed by the first sensor to the expected measurement value.

13. The work vehicle of claim 8, wherein the processor is further configured to automatically adjust a measurement sensed by the first sensor based on the measurement error of the first sensor.

14. The work vehicle of claim 8, further including a third sensor positioned on a second cylinder of the plurality of cylinders of the linkage arrangement, the third sensor configured to sense a parameter of the second cylinder.

15. The work vehicle of claim 8, further including an operational frame movable relative to the body about a primary joint, the working implement coupled to the operational frame and to the linkage arrangement.

16. A work vehicle, comprising:
a body;
an operational frame movable relative to the body about a primary joint;
a linkage arrangement configured to adjust a position of the operational frame relative to the body;
a working implement coupled to the operational frame and movable relative to the body;
a first sensor positioned on the body;
a second sensor positioned on at least one of the operational frame, the linkage arrangement, and the blade; and
a processor configured to determine a measurement error of the first sensor based at least in part on a signal received from the first sensor and a signal received from the second sensor.

17. The work vehicle of claim 16, wherein the processor is configured to wirelessly output the measurement error of the first sensor to a location remote from the work vehicle.

18. The work vehicle of claim 16, wherein the processor is configured to determine a measurement error of the first sensor by calculating an expected measurement value based on the signal from the second sensor.

19. The work vehicle of claim 18, wherein the processor is configured to determine the measurement error of the first sensor by comparing the signal from the first sensor to the expected measurement value.

20. The work vehicle of claim 16, wherein the linkage arrangement includes a plurality of hydraulic cylinders, the work vehicle further including a third sensor associated with one cylinder of the plurality of cylinders, and a fourth sensor associated with another cylinder of the plurality of cylinders, wherein the third sensor and the fourth sensor are each configured to sense a parameter relating to a length of the corresponding cylinder.

* * * * *